United States Patent [19]
Tijanic

[11] Patent Number: 5,901,483
[45] Date of Patent: May 11, 1999

[54] DISPLAY DEVICE AND ARRAY

[75] Inventor: Veso S. Tijanic, Mississauga, Canada

[73] Assignee: Mark IV Industries Limited, Mississauga, Canada

[21] Appl. No.: 08/958,876

[22] Filed: Oct. 27, 1997

Related U.S. Application Data

[63] Continuation of application No. 08/644,219, May 10, 1996, abandoned.

[30] Foreign Application Priority Data

Mar. 5, 1996 [CA] Canada .................................. 2171054

[51] Int. Cl.$^6$ ...................................................... G09F 9/00
[52] U.S. Cl. .......................... 40/449; 40/452; 340/815.62; 345/59; 345/111
[58] Field of Search .............................. 40/449, 450, 451, 40/452; 340/815.44, 815.45, 815.62; 345/55, 59, 82, 87, 108, 111

[56] References Cited

U.S. PATENT DOCUMENTS

| | | | |
|---|---|---|---|
| 3,942,274 | 3/1976 | Winrow | 40/449 |
| 4,163,332 | 8/1979 | Salam | 40/449 |
| 4,833,806 | 5/1989 | Gars | 40/447 |
| 4,914,427 | 4/1990 | Trunk | 40/449 X |
| 5,021,773 | 6/1991 | Browne | 40/452 X |
| 5,022,171 | 6/1991 | Norfolk et al. | 40/452 X |
| 5,050,325 | 9/1991 | Browne . | |

FOREIGN PATENT DOCUMENTS

| | | |
|---|---|---|
| 0401980 | 12/1990 | European Pat. Off. . |
| 0556954 | 8/1993 | European Pat. Off. . |
| 0662398 | 7/1995 | European Pat. Off. . |
| 0731435 | 9/1996 | European Pat. Off. . |
| 29615926U1 | 10/1996 | Germany . |

*Primary Examiner*—Brian K. Green
*Attorney, Agent, or Firm*—Dowell & Dowell, P.C.

[57] ABSTRACT

A display element includes a disk which rotates through 160°–180° to display a bright or a dark side in a viewing direction in ON and OFF positions respectively A constantly on LED is arranged to illuminate the disk in ON position for viewing in a first arc including the viewing direction. The disk masks the LED to viewers in the OFF position of the disk. In addition to light from the illuminated disks, the components may be arranged so that viewers over a second arc may view the LED directly when the disk is in ON position. The elements may be arranged in arrays to form a changeable sign. Thus the array may be made up of single elements, of columns of such elements or of a combination of elements and columns.

4 Claims, 6 Drawing Sheets

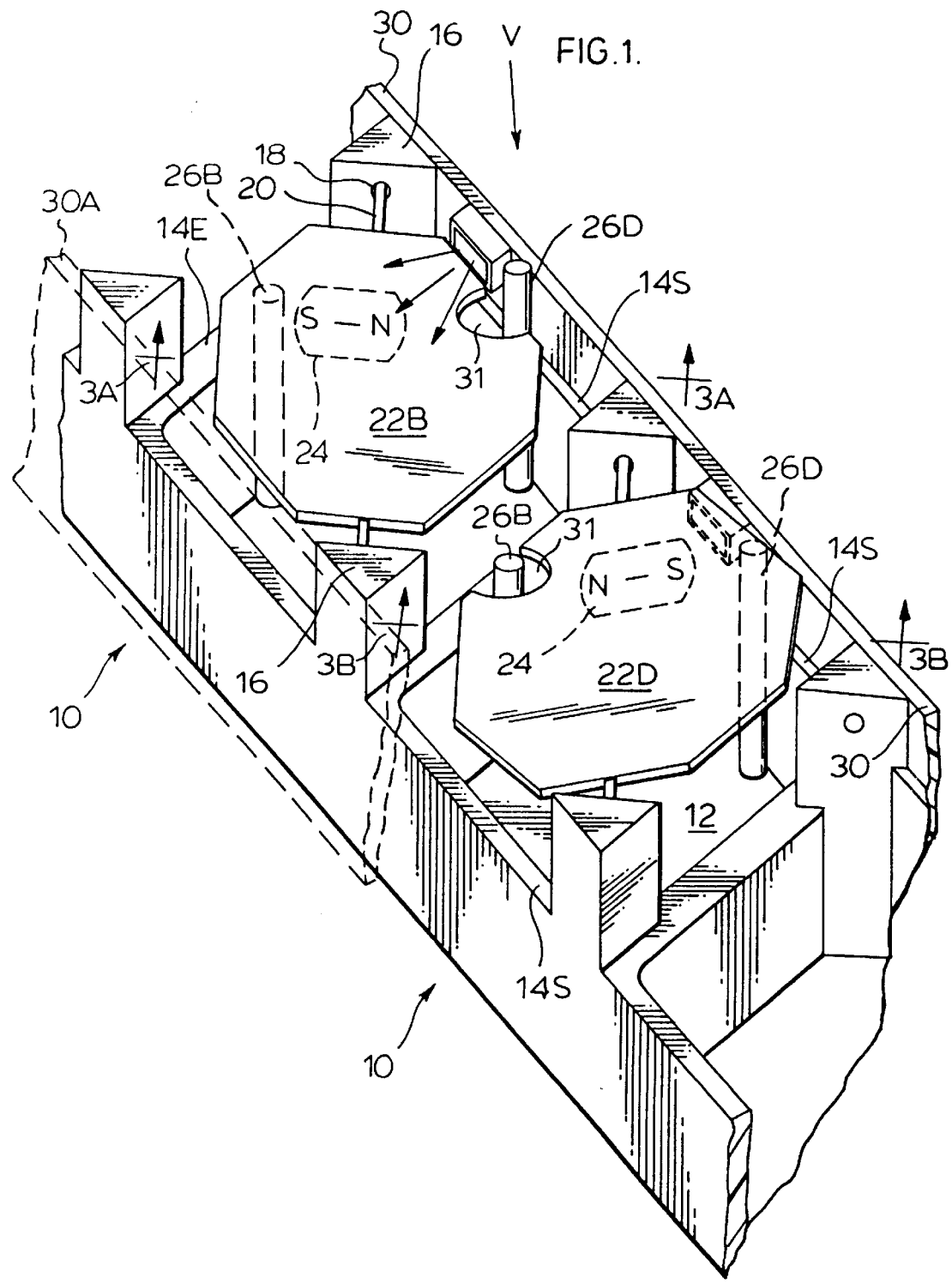

DISPLAY DEVICE AND ARRAY

This application is a continuation of application Ser. No. 08/644,219, filed May 10, 1996, now abandonded.

BACKGROUND OF THE INVENTION

1. Field of the Invention

This invention relates to a display element which may be used alone as an indicator but will be more commonly used as a pixel in an array of such elements to form a changeable display sign. The invention will be found particularly useful for signs and displays which must be viewed over wide angles such as bus destination signs.

2. Summary of the Invention

The display element is of the type using a rotor disk defining a median plane, having opposed sides which respectively contrast and conform with their background and which is rotatable about a rotation axis approximately parallel to said median plane to display the bright or dark sides of the disk in a viewing direction which is considered the axis of a viewing cone (not necessarily a surface of revolution) which surrounds the viewing direction. The stator which forms the background to each disk is coloured darkly to contrast with the disk bright side; and conform to the disk dark side. The bright and dark sides are displayed in the ON and OFF respective positions.

A light emitting diode (LED) corresponding to each disk is positioned to form part of the disk's pixel when the bright side is displayed (called the ON position) the LED being positioned and directed to illuminate the bright side of the disk when oriented to ON positions The LED is permanently on and so must be masked to the viewer in the OFF position of the disk.

'Forward' and 'rearward' are respectively, the directions from the display element toward the viewer, and the opposite direction.

An 'array' is the entire bus sign or other sign, composed of 'sub arrays' which are each made up of a column of individual display elements, or of individual elements.

Reference to an 'LED' herein is intended to include a cluster of such LED's.

The 'viewing direction' is the general centre of the locations (projected on a plane perpendicular to the viewing direction) from which the display element, or any array thereof, is intended to be viewed.

The 'viewing cone' surrounds the viewing direction and includes the projections on such plane of the positions from which the display elements or an array thereof is intended to be viewed.

In a preferred aspect of the invention herein the angle through which the illuminated disks (in plan view) may be viewed is about 150° approximately symmetrically disposed about the longitudinal axis of a bus on which the array is disposed. However, the direct light from the LEDs may be viewed over an arc of about 75° from the longitudinal axis on the side of the bus toward which the light from the LED is directed. This is useful since a bus sign is often viewed from the sidewalk. Thus, for buses for use in most countries other than England and Australian the 75° sector will be on the right of the bus center line, and in England and Australia on the left.

It is known to use such a disk augmented by the end of an optic fibre. See for example patents:

U.S. Pat. No. 4,974,353 dated Dec. 4, 1990, Norfolk
U.S. Pat. No. 5,022,171 dated Jun. 11, 1991, Norfolk, et al
U.S. Pat. No. 5,055,832 dated Jun. 8, 1991, Browne However, optic fibres while suitable for relatively narrow angle viewing are not so suitable for viewing over wide angles, as are LED's. Moreover, LED's are cheaper to a sufficiently marked degree, that a display application with LED's may be practical where a similar application with fibres would be impractical.

Other patents have used LED's with a rotating disk. See for example, U.S. Pat. No. 5,050,325 dated Sep. 24, 1991. However this patent does not provide for masking of the LED by the disk per se,nor for wide angle viewing. Hence the LED had to be switched off in OFF state. The design of the present display element assumes that the LED will be continuously on while the disk switches between ON and OFF positions, thus avoiding the cost of individual switching circuitry for each LED. Such switching requires design complexity and expenses Accordingly, it is an object of this invention to provide a display element, for use alone or in an array of such elements, wherein the appearance of a rotatable flip disk is augmented in ON orientation by an LED, which LED must be masked by the disk, to the viewer, in OFF orientation and wherein the rays from the LED are directed to illuminate only the bright side of the disk with which it is associated and to be viewed directly It is an object of this invention to provide a display element or an array thereof allowing, in ON position, viewing over a wide angular range and in OFF position masking the rays over a wide angular range, and preferably where the rays reflected from a disk illuminated by the LED are visible through a sector in plan view which is symmetric with regard to the forward direction in plan view.

By 'disk viewing direction' herein I mean the direction approximately perpendicular to the average attitude of the illuminated disk in ON and OFF position and perpendicular to its rotary axis. This will not be parallel to the disk in ON and OFF position since the ON and OFF disk orientations are slightly offset from each other to reduce rotation below 180° where a magnetic drive is used, for reasons associated with the drive. Where an array of display elements is used, the viewing direction is taken as perpendicular to the plane approximating the locus of the array.

By 'plan view' I mean the view in the direction perpendicular to the viewing direction and parallel to the median plane of an array. Plan view in relation to a bus will therefore be approximately a vertical view but in other applications it may have any real orientation.

It will be realized from what has already been said that for a bus or other vehicle destination sign, the plan view will be in, approximately, a horizontal plane and that the viewing locations for viewing directly LED light will be all on one side of light viewing direction for the illuminated disks.

The invention in one aspect provides a display element suitable for use as a pixel in an array, having a disk movable between an ON position (displaying a bright side to a viewer) and an OFF position (displaying a dark side to the viewer) with an LED positioned to illuminate the bright side of the disk in ON position, and where the element or an array thereof may be located in immediate proximity to a bus (or other vehicle) windshield to be viewed by pedestrians therethrough. The proximity of the display element to the windshield is limited only by the spacing required to allow movement of the disk between ON and OFF positions and static charge interaction between disk and windshield.

The closer the array is to the windshield, the wider may be the viewing angle.

It is an object of this invention to provide a display element wherein the light source used is markedly maintenance free and inexpensive in contrast to alternate designs.

It is an object of this invention to provide a display element for forming a pixel which is suitable for relatively large multiple pixel arrays (for example, of 20 by 40 pixels) to provide good definition in the sense of providing a small pixel relative to the size of the array and a pixel having a relatively large effective area.

By 'effective area' I mean the percentage of the sign area which is occupied by the bright areas of the disks when all are ON. This is a measure of the sign's efficiency even though it may not be strictly accurate in view of the effects of the light effects of the LED's and the preferred angle of the disk bright panels to the viewing direction. The need to have as large an effective surface as possible renders preferable the use of rectilinear elements since these tend to have the best 'packing factor' and hence provide the largest ON area in a display. The need to supply pixels, small in area relative to the size of the array, suggests, therefore the use of square pixels.

'LED' herein refers to the chip which is mounted in a lens, although the chip plus lens is elsewhere frequently called, collectively, an LED.

The invention therefore provides, in one aspect, a display element, or a column or array thereof where the stator is preferably an open front housing, usually of approximately square shape, and a disk designed to rotate about an axis to display a bright or dark side in the viewing direction. (The background to the disk, when viewed in the viewing direction is typically coloured to contrast with the bright disk side and to match the dark disk side). An LED associated with the stator is located and provided with shroud means so that the LED rays illuminate the bright side of the disk for viewers on each side of the viewing directions. Means prevents the escape of LED rays in directions transverse to the viewing direction.

The preferred drive for the disk is electromagnetic in accord with techniques well known to those skilled in the art. However, other drives may be used within the scope of the invention.

In a preferred form of the invention, a printed circuit board ('PCB') is mounted on one side of the disk and an LED mounted so that its rays will illuminate the bright side of the disk when the latter is in the ON position. This will depend on the attitude of the disk when ON. Preferably in ON position, the bright side of the disk is tilted slightly toward the LED and the LED rays are directed transverse to the viewing direction. Means, preferably a housing on the sides of the LED lens (relative to the desired direction of LED rays); and the PCB on the back, prevent the escape of rays diverging very much from the desired LED ray direction. Sufficient divergence of LED rays from the desired LED ray disk-illuminating directionDexists that viewers on a side-walk in front of the bus (on one selected side) may view the direct rays from the LEDs) when the disk is in ON position.

The wall need not be a PCB, within the scope of the invention. However, it is considered most suitable since it is then convenient to provide metal strips on the PCB board, to provide the LED leads.

Preferably, only one side wall is provided rather than two for each element or column thereof. The opposed wall is then provided by the adjacent element or columns thereof in the direction of LED radiation.

BRIEF DESCRIPTION OF THE DRAWINGS

In drawings which illustrate a preferred embodiment of the invention:

FIG. 1 is a partial view of a column of display elements in accord with the invention.

DESCRIPTION OF THE PREFERRED EMBODIMENT

Figure 2A:
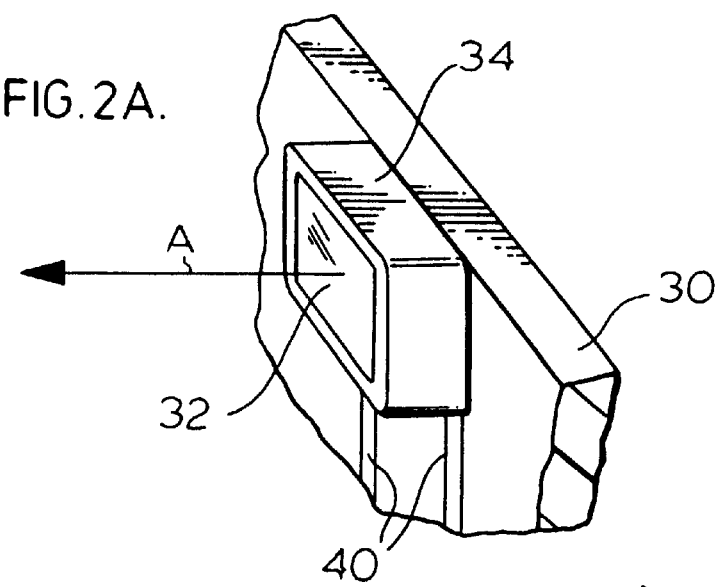
FIG. 2A shows an LED, lens and housing assembly in accord with the invention.
Figure 2B:
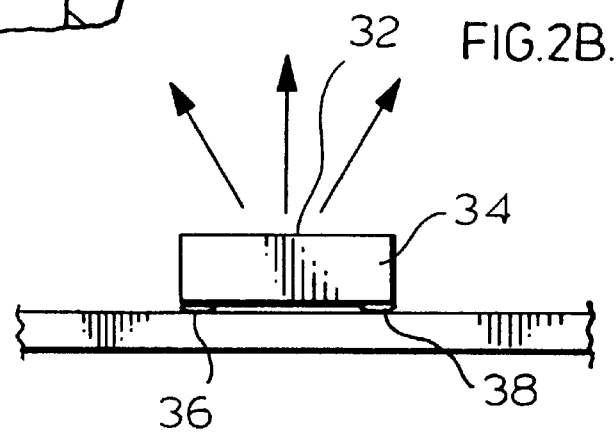
FIG. 2B shows a detail of the LED housing and the PCB.

In the drawings FIG. 1 shows a portion of a column of display elements in accord with the invention. The stator 10 of each element shows an open front housing with base 12 side walls 14S end walls 14E extending forwardly from the base to define a square display element having a good packing factor and making efficient use of the display area.

At diametrically opposed corners of the element square, towers 16 have wells 18 to receive the spindles 20 of a display disk having a dark side 22D and a bright side 22B. The disk is notched at 31 to allow it to rotate past the then adjacent core 26 in moving between limiting positions.

The drive is, preferably magnetic and a magnet 24 has its N-S axis transverse to the rotation axis of the disk and is driven by the switching of the cores 26B and 26D which are always of opposition polarity but switched to cause the disk to rotate. A permanent magnet 29 with its polar axis in the viewing direction, V is provided, centered in base 12, to modify the field provided by cores 26 to provide a better starting torque. The drive is preferably in accord with the teachings of U.S. Pat. No. 3,518,666 to M. K. Taylor, of Jun. 30, 1970 whose contents are included herein by reference. The Cores' polarities are switched by surrounding coils 28 from a current source, not shown.

(A magnetically driven disk typically rotates at 160° to <180° between ON and OFF limiting positions since a full 180° rotation is difficult because of lack of starting (magentic) torque).

The magnet 24 is preferably contained in the central layer of a layered disk in accord with the teaching of U.S. Pat. Nos. 3,953,274 and 3,871,945, both to Winrow et al. whose teachings are included herein by reference. However, the magnet may be otherwise installed or mounted.

A different magnetic drive may be used, or a nonmagnetic drive, all within the scope of the invention.

Figures 3A, 3B:
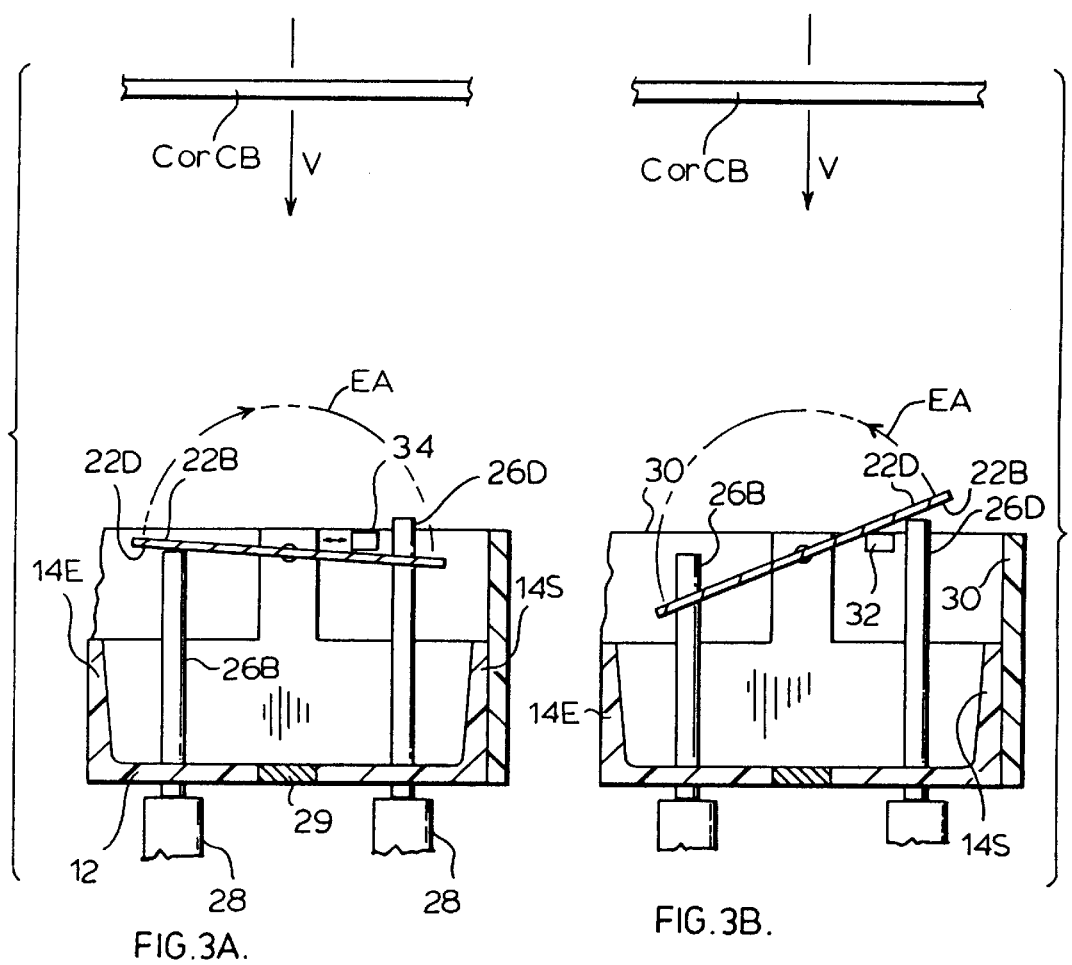
FIG. 3A is a section along the line 3A—3A of FIG. 1 showing section of a disk in ON position displaying its bright side.
FIG. 3B is a section along the lines 3B—3B of FIG. 1 showing a section of a disk in OFF position, displaying its dark side.
Figure 4:
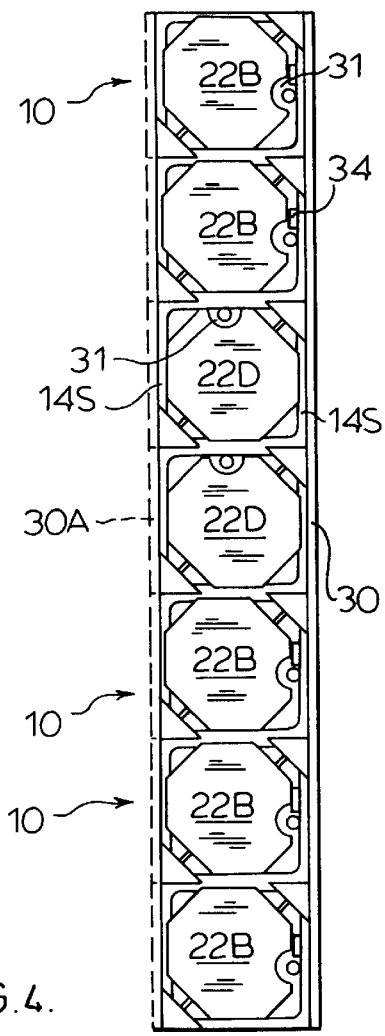
FIG. 4 is a front view of a column of display elements.

On one side of each elements a side wall 30 is provided extending forwardly of walls 14E and walls, 14S. As indicated in FIG. 4 all the walls 30 of a column of individual elements 10 can be combined in a single wall and the elements 10 combined in a single molding. The wall 30 is preferably a PCB. On the wall facing the disk is mounted an LED chip (not shown) and lens 32 in a housing 34. The LED is mounted on the board 30 by its anode and cathode 36 and 38 with foil conductors 40. The housing 34 is apertured to allow the rays from the LED to be emitted in a small cone centered about an LED ray axis A transverse to the viewing direction and directed at the disk. The disk (in ON position) is tilted slightly toward the LED (by adjustment of the length of core 26B), whose end acts as the stop in the ON limiting position FIG. 3A so that the bright surface 22B of the disk is illuminated by the cone of LED rays about the LED ray axis. The escape of rays in undesired directions is prevented in transverse direction by the opaque walls of housing 34 (which has an open rear for the LED connections) and rearwardly by wall 30.

The LED ray axis direction is interdependant with the disks attitude in ON orientation so that it is within the scope of the invention to change the angle of the disk and its bright side 22B but in such case the housing 34 should be redirected so that the rays on axis A will illuminate the bright side 22B.

Figure 7:
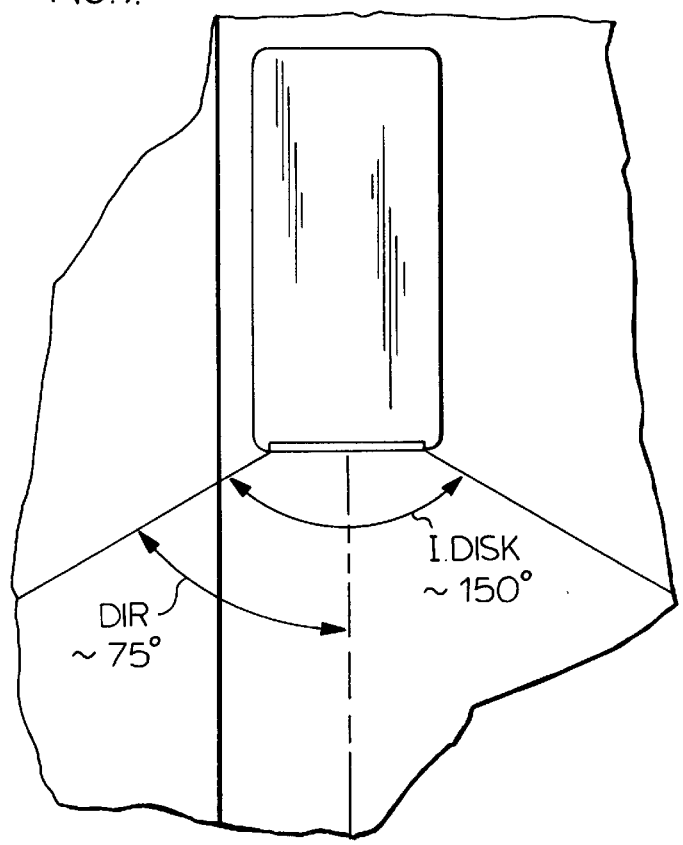
FIG. 7 is a view showing the viewing angles for the illuminated dot and for the LED directly.

It should also be noted that some rays from the LED may pass in front of the disk bright side, (in ON position only) to reach viewers directly (See arc DIR in FIG. 7 (about 75°)).

On the other hand the disk bright faces illuminated by the LED may be seen about the symmetrical arc I. DISk of about 150°.

The LED lens may be designed, in a manner well known to those skilled in the art to provide a range of viewing angles DIR of about 75° to the rights of the longitudinal axis of the bus (FIG. 5) and to provide a range of viewing angles I .DISK of about 150° approximately symmetrical about the longitudinal axis.

It will be noted that the disk masks, in its OFF position to a sufficient degree, the escape of light in the viewing direction or in the viewing cone. The end of core 26D stops the disk in OFF position. The PCB wall 30 prevents the sideways escape of rays from the LED in both disk attitudes.

Although a wall could be supplied on the other side of the element it is preferred to have only one wall 30 so that the escape of light is avoided by the wall 30A (FIGS. 1 and 6), shown in dotted form, being the wall 30 of the next adjacent element on the side of the element opposite wall 30.

Figure 6:
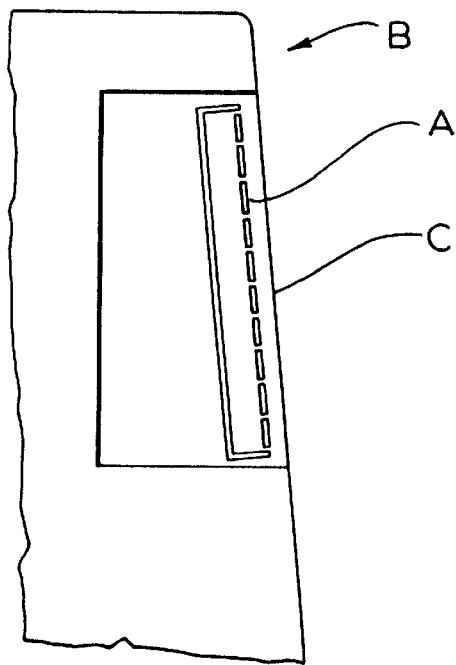
FIG. 6 is a schematic section of part of the bus and sign taken on a vertical plane along the longitudinal axis of the bus.

FIG. 4 shows a seven element column with five of the elements showing the bright side 22B and two of the elements showing the dark side 22D. FIG. 6 also shows the wall 30A of the next element in the array.

Figure 5:
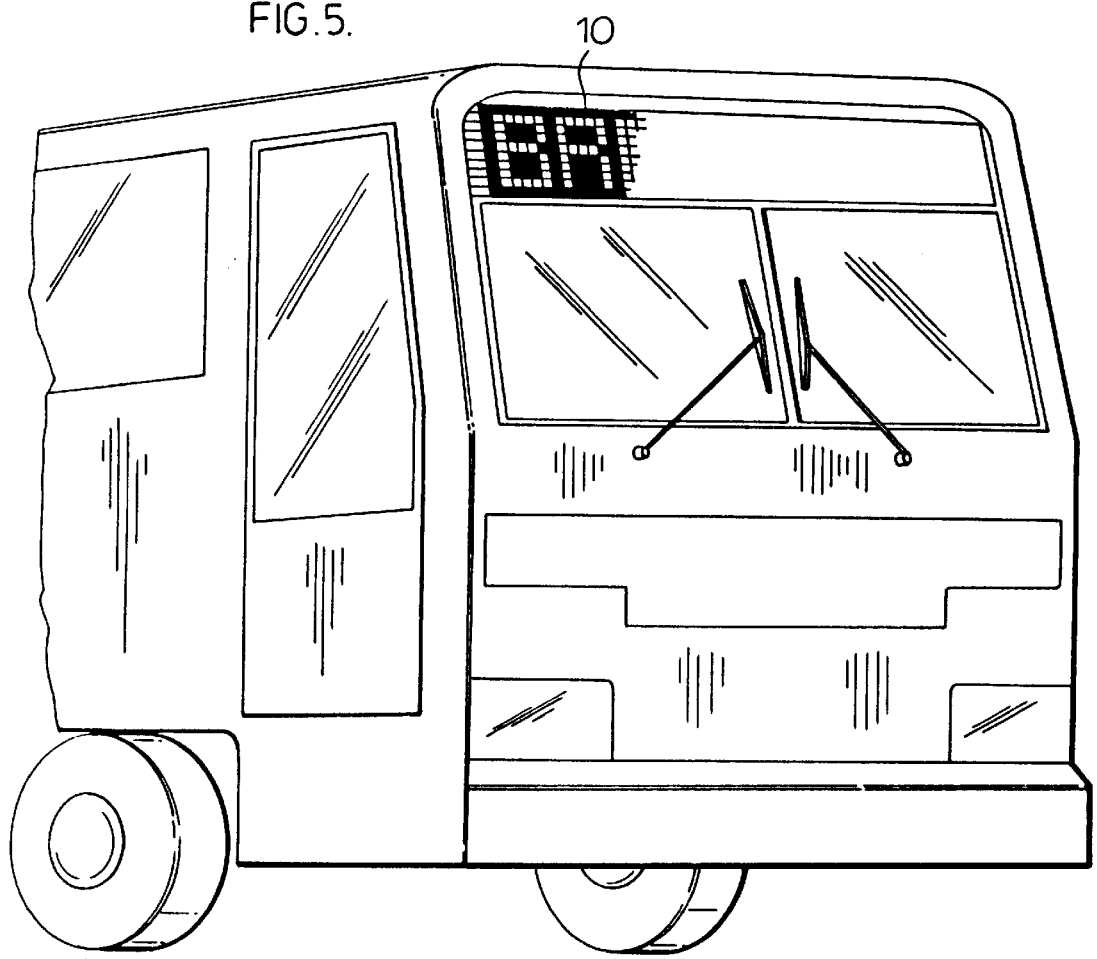
FIG. 5 is a schematic view of the front of a bus with its destination sign formed by an array in accord with the invention.

FIG. 5 shows a bus carrying an array showing a destination The schematic FIG. 4 is not indicative of pixel to array size. In fact the destination sign could be, for example, 20 pixels high and, for example 40 pixels wide.

FIG. 6 is demonstrative of how close the array A may be to the windshield C in the bus B for viewing by a pedestrian through the windshield. This 'immediate proximity' can be achieved because of the lighting provided intrinsically of the element by the LEDs.

Figure 8A:
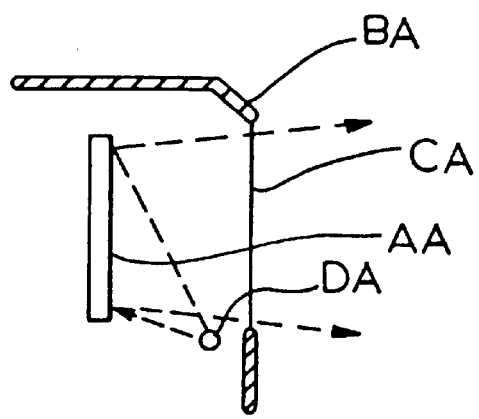
FIG. 8A and 8C show arrangements of a prior art sign array in a bus.
Figure 8B:
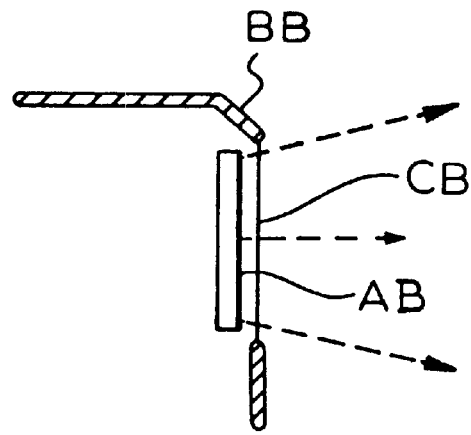
FIG. 8B shows the arrangement of an array of inventive display elements for comparison with FIG. 8A and showing an alternative to FIG. 6.
Figure 8C:
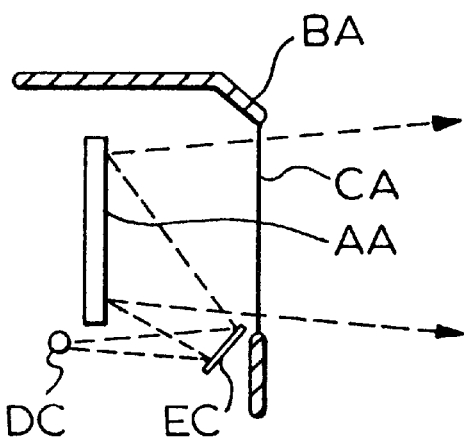

The spacing of the array and its display elements in a bus or other vehicle sign is also demonstrated in FIGS. 8A and 8C (Prior Art) and FIG. 8B showing an array created using inventive elements. In FIG. 8A the prior art arrangement is shown. There a bus BA has a windshield CA and a dot (or disk) matrix display AA located to be viewed through the windshield CA. However, the display AA must be set back from the window CA to allow the disk bright sides to be illuminated by a lamp or lamps DA. In FIG. 8B, the dot (or disk) array AB may be located as close to bus BB windshield CB as operation of the disks will allow having regard to operation of the disks and the avoidance of static charge interaction between disks and windshield as hereinafter discussed. (Since each inventive disk is illuminated by its own LED). It will be seen that the arrangement permitted by the inventive display elements permits much wider angle viewing of the array AB in all directions, than of the array AA. A further example of the prior art is shown in FIG. 8C wherein the halogen lamp is located beside or behind the display AA and arranged to shine on mirror EC which is angled and/or shaped, to distribute the reflected rays over the array. From the geometry it will readily be realized that in the prior art equipment of FIG. 8C the viewing angle is substantively narrower than that of 8B just as is the equipment of prior art equipment of 8A has a narrower viewing angle than that of 8B.

Moreover in both prior art 8A and 8C equipment it will be noted that the disks of the array will be unevenly illuminated since the light rays must travel farther from their source to the top (or 'lamp remote' side) of the array than to the bottom In contrast, with the inventive array of FIG. 8B the illumination will be more uniform since each disk is illuminated by its corresponding LED. Proximity of the array to the window is limited by two criteria.

First in some cases, the non conducting windshield, particularly if plastic, may tend to acquire a significant static charge which, if to close to the disk, could interact with static electricity developed on insulated portions of the disk and interfere with disk operation. Thus, the disc locus must be sufficiently spaced from the windshield so that this does not occur. In an example only, disks of diameter 0.5" 0 have been provided with a spacing of 1" between the disk rotary axis and the windshield C, (or CB) (See also FIGS. 3A and 3B (which are not to scale)).

Second there must be some spacing between the disk locus of rotation and the windshield (See arc EA in FIGS. 3A and 3B) so that the disk may rotate.

The phrase 'immediate proximity' is therefore subject to such first and second limitations.

Thus, it is obvious from simple geometry that the improved (closer) location of the array and its elements to the windshield, widens the possible angle of viewing the arrays The vertical array of FIG. 8B may be contrasted with the slightly sloping array of FIG. 6 although in each variant the widened possible angle of viewing is present. This is in contrast to the larger array windshield spacing of a prior art array which had to be set back from the windshield to allow for the presence of bus mounted lighting to shine rearward on the array.

Because the inventive array may be placed close to the windshield it must frequently be curved in plan view to fit the curving contour of the windshield. Hence the array is preferably composed of columns which are only one element wide, as in FIG. 6, and of single elements to the extent necessary to complement the modules.

FIG. 7 indicates preferred range of viewing angles:I. DISK of about 150° for the illuminated disks and an asymmetric range of viewing angles DIR of about 75° for direct viewing of the LEDs.

The asymmetry shown will be applied where the adjacent sidewalk is to the right of the bus, that is most countries other than U.K. or Australia. Buses for U.K. or Australia may be produced with the elements 'mirror image' reversed from left to right. In some cases the elements as shown may simply be inverted.

There is no limitation on the shape of the disk but square or rectangular provides a more efficient use of the space.

Although the rotation axes of the disk are shown as diagonal, vertical or horizontal axes may be used within the scope of the invention. Thus, the invention may for example, be used with disks having vertical axes and elongated shapes are shown in U.S. Pat. No. 4,577,427 to John Browne dated Mar. 25, 1986 whose contents are included here by reference.

Although the ends of cores 26B and 26D act as the stops for the disk in ON and OFF position, respectively, determining the disks attitude in these positions, the stops may be otherwise provided and the cores used only for magnetic drive.

I claim:

1. A display element for selectively displaying a surface thereof in a direction of viewing comprising:

a movable disk having a bright surface and a dark surface, a support structure including means for moving said movable disk from a first position wherein said bright surface is oriented to be displayed in the direction of viewing to a second position wherein said bright surface is oriented so as not to be displayed in the direction of viewing, said means for moving including means for supporting said disk for movement about a rotational axis which extends approximately transversely to the direction of viewing and said disk being mounted on a stator to rotate about an angle of between 160° and 180° between said first and said second positions, and illumination means individual to said movable disk mounted so as to be forwardly in the direction of viewing of at least a portion of said bright surface when said movable disk is in said first position and rearwardly of said movable disk in the direction of viewing when said movable disk is in said second position whereby said illumination means illuminates said bright surface of said movable disk in said first position and is covered by said movable disk in the direction of viewing when said movable disk is in said second position.

2. The display element of claim 1 wherein said illumination means is an LED.

3. The display element of claim 2 wherein said dark surface is oriented toward said direction of viewing in said second position.

4. The display element of claim 2 wherein said LED is mounted within a housing which includes an aperture to direct rays of light along an axis transverse to the direction of viewing.

\* \* \* \* \*